US009736973B2

(12) United States Patent
Widmaier et al.

(10) Patent No.: US 9,736,973 B2
(45) Date of Patent: Aug. 22, 2017

(54) SOIL WORKING TOOL

(75) Inventors: Helmut Widmaier, Aichhalden (DE); Florian Smeets, Baiersbronn (DE)

(73) Assignee: Betek GmbH & Co. KG, Aichhalden (DE)

( * ) Notice: Subject to any disclaimer, the term of this patent is extended or adjusted under 35 U.S.C. 154(b) by 671 days.

(21) Appl. No.: 13/810,155

(22) PCT Filed: Jul. 12, 2011

(86) PCT No.: PCT/EP2011/061875
§ 371 (c)(1),
(2), (4) Date: May 28, 2013

(87) PCT Pub. No.: WO2012/007470
PCT Pub. Date: Jan. 19, 2012

(65) Prior Publication Data
US 2013/0240225 A1    Sep. 19, 2013

(30) Foreign Application Priority Data

Jul. 15, 2010  (DE) .................. 20 2010 008 085

(51) Int. Cl.
*A01B 23/02*  (2006.01)
*A01B 35/26*  (2006.01)
*A01B 15/02*  (2006.01)

(52) U.S. Cl.
CPC .............. *A01B 35/26* (2013.01); *A01B 15/02* (2013.01); *A01B 23/02* (2013.01)

(58) Field of Classification Search
CPC ..................................... A01B 23/02

USPC ................... 172/772.5, 730; 37/452
See application file for complete search history.

(56) References Cited

U.S. PATENT DOCUMENTS

| 53,491 | A | * | 3/1866 | Saladee et al. | ............... 172/753 |
| 991,810 | A | * | 5/1911 | Whiting | ................. A01B 15/08 |
| | | | | | 172/182 |
| 1,755,438 | A | * | 4/1930 | Ferguson | .............. E02F 9/2808 |
| | | | | | 37/452 |
| 2,316,097 | A | * | 4/1943 | Mohr | ..................... A01B 15/06 |
| | | | | | 172/761 |
| 2,337,777 | A | * | 12/1943 | Seaholm | ....................... 172/722 |
| 3,061,021 | A | * | 10/1962 | Shader | .......................... 172/750 |
| 3,357,117 | A | * | 12/1967 | Petersen | ........................ 37/449 |
| 3,971,323 | A | * | 7/1976 | Beiswenger | ............ E01B 27/12 |
| | | | | | 104/10 |

(Continued)

FOREIGN PATENT DOCUMENTS

EP    0 923 851 A1    6/1999
EP    0 923 951 A2    6/1999
(Continued)

*Primary Examiner* — Thomas B Will
*Assistant Examiner* — Joel F. Mitchell
(74) *Attorney, Agent, or Firm* — Pauley Erickson & Kottis

(57) ABSTRACT

A soil working tool, such as a cultivator tip, having a carrier which bears a primary cutting element and at least two secondary cutting elements on a cutter holder, wherein both the primary cutting element and the secondary cutting elements include a cutting edge. To optimize the penetration to achieve better cutting results, the cutting edges of the secondary cutting elements are arranged offset with respect to the cutting edges of the primary cutting element.

34 Claims, 7 Drawing Sheets

(56) References Cited

U.S. PATENT DOCUMENTS

| | | | | |
|---|---|---|---|---|
| 4,127,952 A | * | 12/1978 | Chamberlain | E02F 9/2816 |
| | | | | 37/450 |
| 4,408,667 A | * | 10/1983 | Jarvis | 172/722 |
| 4,762,184 A | * | 8/1988 | Yeomans | 172/704 |
| 4,779,686 A | * | 10/1988 | Ryan | 172/730 |
| 5,224,555 A | * | 7/1993 | Bain et al. | 172/772.5 |
| 5,540,288 A | * | 7/1996 | Dietrich, Sr. | 172/196 |
| 7,104,341 B2 | * | 9/2006 | Steinlage et al. | 172/730 |
| 2006/0231275 A1 | | 10/2006 | Bull et al. | |
| 2008/0257576 A1 | * | 10/2008 | McNabb | 172/730 |
| 2012/0145421 A1 | | 6/2012 | Smeets et al. | |

FOREIGN PATENT DOCUMENTS

| | | |
|---|---|---|
| FR | 2 603 151 | 3/1988 |
| WO | WO 2010/149464 A1 | 12/2010 |

* cited by examiner

SOIL WORKING TOOL

BACKGROUND OF THE INVENTION

Field of the Invention

This invention relates to a soil working tool, in particular a cultivator tip, having a support which supports a primary cutting element and at least two secondary cutting elements on a cutter holder, wherein both the primary cutting element and the secondary cutting elements each has a respective cutting edge.

Discussion of Related Art

A soil working tool of this kind is known from German Patent Reference DE 10 2009 029 894.0, wherein the cutting elements are soldered to the cutter holder and the primary cutting element forms a cutting edge transverse to the advancing direction of the tool. The secondary cutting elements are set at an angle to the primary cutting element.

SUMMARY OF THE INVENTION

One object of this invention is to provide a soil working tool of the kind mentioned above that makes it possible to optimize penetration for the benefit of a better cutting result.

The above and other objects of this invention are attained with a soil cutting tool having cutting edges of secondary cutting elements situated so that they are offset relative to the cutting edges of the primary cutting element, with the cutting edges of the secondary cutting elements extending parallel to one another.

Because the cutting edges of the secondary cutting elements are no longer oriented obliquely and positioned in a V-shape relative to one another as in the prior art, a cleaner, straighter cut is produced, which produces a more definite cutting result and because of the shorter cutting edges, requires less tractive effort. This improves penetration into the soil. Furthermore, for the benefit of lower manufacturing costs, shorter lengths of hardened metal can also be used, making it possible to maintain the same plowshare width as in the prior art.

According to one embodiment of this invention, it is possible for the cutting edges of the secondary cutting elements to be arranged flush with one another. This produces a uniform tool load during the cutting engagement, which can prevent damage to the attachment of the cultivator tip.

It is preferable for the cutting edge of the primary cutting element to extend parallel to the cutting edges of the secondary cutting elements. This produces a stepped cutting engagement with clean, straight cuts.

In some embodiments, good cutting results can be achieved if the cutting edge of the primary cutting element is spaced at least 4 mm apart from the cutting edge of the secondary cutting element. This spacing achieves a stepped cutting engagement for the benefit of a lower required advancing power. This also avoids the formation of a trench bottom.

The cutting edge of the primary cutting element should be spaced a maximum of 15 mm from the cutting edge of the secondary cutting element in order to achieve a particularly stable tool design.

A soil working tool according to this invention can be embodied so that the cutter holder has cutting element mounts for the primary cutting element and the secondary cutting elements. The cutting element mounts have a seat surface and a contact surface situated at an angle thereto. The primary cutting element and the secondary cutting elements are each supported with a fastening section on the seat surface and with a cutting attachment on the contact surface. This achieves a mechanically stable cutting geometry. It is possible for the contact surfaces and/or the seat surfaces of the secondary cutting elements and of the primary cutting element to be oriented parallel to one another. This makes it possible to ensure a simple, exact, and reproducible orientation of the secondary cutting elements and the primary cutting element.

According to one embodiment of this invention, it is possible for the primary cutting element to protrude in the advancing direction relative to the secondary cutting elements or for it to be recessed relative to them.

Preferably, the seat surfaces are spaced apart from one another by a distance in the range from 8 to 14 mm. This produces stable tooth geometries on the cutter holder for accommodating the cutting elements. In this connection, it is also particularly possible for the contact surfaces to be spaced apart from one another by at least 4 mm, but preferably by a distance in the range from 15 mm to 30 mm.

If the diverting surfaces are oriented at an angle to one another, preferably by an angle in the range between $0.1°$ and $<90°$, then the aggressiveness of the soil working tool can be adjusted by the way in which the diverting surfaces of the secondary cutting elements are set relative to the primary cutting element. More steeply angled diverting surfaces result in a more powerful displacement of material, while more gently sloped angles reduce the required traction force of the machine.

In another embodiment of this invention, both the primary cutting element and the secondary cutting elements have diverting surfaces that are situated so that they are parallel to one another and spaced apart from one another by at least 4 mm, but preferably by a distance in the range from 5 mm to 11 mm. The provision of parallel diverting surfaces makes it possible to convey the cut material away in a precise fashion. The diverting surfaces can also protect the steel body from erosion.

For the benefit of a symmetrical distribution of force, it is possible according to this invention for the secondary cutting elements to be arranged on the cutter holder symmetrical to the primary cutting element and on both sides of it. This produces an inward-directed flow of material from the secondary cutting elements to the primary cutting element. The secondary cutting elements are subjected to a greater level of abrasive wear, which is accompanied by the benefit of a lower stress on the primary cutting element. In addition, the inward-directed material flow subjects the cutter holder to less abrasive wear on the sides.

In particular, it is also possible for at least two secondary cutting elements to be provided on each side of the primary cutting element. This makes it possible to produce a plurality of cutting steps.

A good distribution of force on both the primary cutting element and the secondary cutting elements can be achieved in a simple way by embodying the width of the cutting edges of the secondary cutting elements to be at least 0.5 times the width of the cutting edge of the primary cutting element.

A soil working tool according to this invention can be embodied so that the cutting edge of the primary cutting element is arranged perpendicular to the advancing direction (V) and is offset in the direction of the force of gravity relative to the cutting edge of the secondary cutting element. This achieves a furrow-opening action and reduces the undesirable formation of a trench bottom.

In one embodiment, it is also possible for the support to have a raised breaking rib and/or a recessed breaking groove. This achieves a breaking up of clods and/or a displacement of soil.

BRIEF DESCRIPTION OF THE DRAWINGS

This invention is explained in view of exemplary embodiments shown in the drawings, wherein.

DETAILED DESCRIPTION OF THE INVENTION

Figure 1:
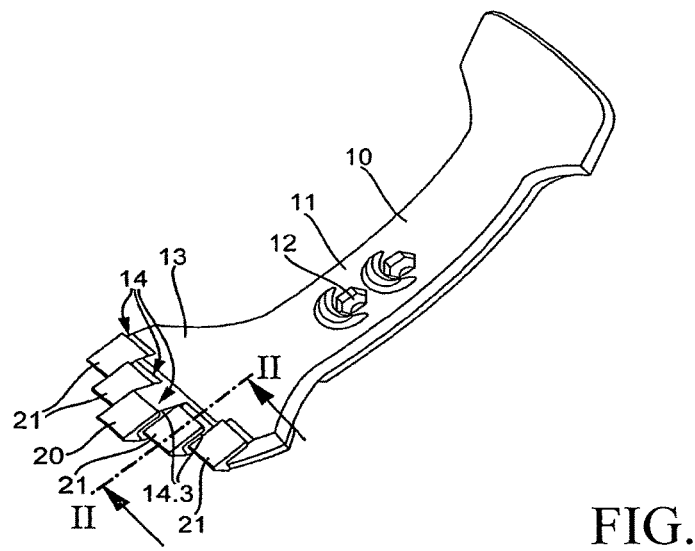
FIG. 1 is a perspective depiction of a cultivator tip, according to one embodiment of this invention.

FIG. 1 shows a cultivator tip with a support 10 comprising of a steel body. The cultivator tip has a fastening section 11 with fastening mounts 12 in the form of through openings. The support 10 has a cutter holder 13 at one end, which is equipped with cutting element mounts 14.

Figure 2:
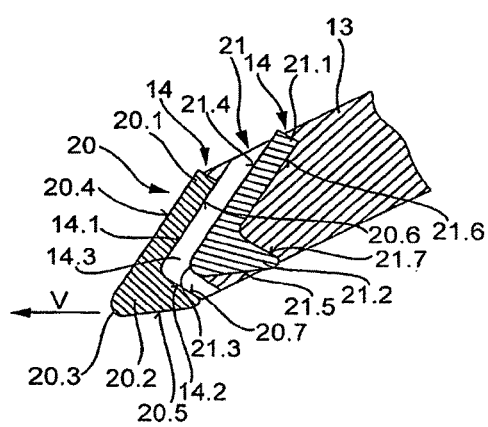
FIG. 2 is a sectional view of the cultivator tip from FIG. 1, viewed along the cutting line labeled II-II in FIG. 1.

As clear from FIG. 2, the cutting element mounts 14 have a seat surface 14.1 that is oriented in the advancing direction V of the cultivator tip. This seat surface 14.1 is adjoined at an angle by a contact surface 14.2. The cutting element mounts 14 accommodate a primary cutting element 20 and four secondary cutting elements 21, as shown in FIG. 1. The primary cutting element 20 and the secondary cutting elements 21 can be embodied identically. If necessary, however, it is also possible for the secondary cutting elements 21 to have a narrower width transverse to the advancing direction V, but to otherwise be identical to the primary cutting element 20 so that they can be manufactured in the same tool mold equipped with sliding side walls. The principle cutting element 20 and the secondary cutting elements 21 have a fastening section 20.1, 21.1, which is embodied as plate-shaped. The fastening section 20.1, 21.1 forms a support surface 20.6, 21.6. The fastening section 20.1, 21.1 has a cutting attachment 20.2, 21.2 integrally formed onto it. The cutting attachment 20.2, 21.2 forms another support surface 20.7, 21.7. The support surfaces 20.6, 20.7 and 21.6, 21.7 are oriented at right angles with respect to each other. The primary cutting element 20 and the secondary cutting elements 21 form a frontal diverting surface 20.4, 21.4 that tapers down to a rounded cutting edge 20.3, 21.3. The cutting edge 20.3, 21.3 transitions into an open surface 20.5, 21.5 that faces toward the rear.

A soldered connection is used to fasten the primary cutting element 20 and secondary cutting elements 21, which are of a hard material, in particular a hard metal. It is also possible to use an adhesive connection to enable a more advantageous manufacture. The primary cutting element 20 and the secondary cutting elements 21 are placed with their support surfaces 20.6, 20.7 and 21.6, 21.7 against the corresponding seat surfaces 14.1 and contact surfaces 14.2. The integrally joined connection occurs or takes place on these surfaces. When mounted, the cutting edges 20.3, 21.3 of the primary cutting element 20 and secondary cutting elements 21 are oriented parallel with respect to one another. In this position, the cutting edges 21.3 of the secondary cutting elements 21 are situated flush with one another in pairs. In addition, the diverting surfaces 20.4 and 21.4 and the open surfaces 20.5 and 21.5 are respectively situated parallel to one another, as clearly shown in FIG. 2. The diverting surfaces 20.4 and 21.4 and/or the open surfaces 20.5 and 21.5 can also be situated at an angle with respect to one another, as shown in the exemplary embodiment according to FIGS. 5 and 6. FIG. 2 also shows that the seat surfaces 14.1 are adjoined at right angles by flanks 14.3 of the cutter holder 13. The fastening sections 20.1 of the primary cutting element 20 and the secondary cutting elements 21 cover the seat surfaces 14.1 in a direction transverse to the advancing direction V so that the relatively softer material of the cutter holder 13 is protected.

Figure 3:
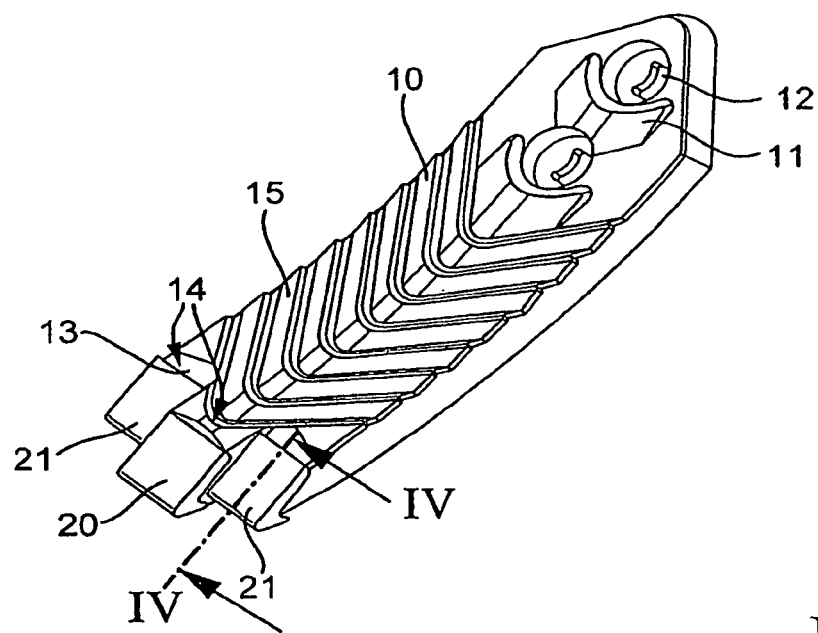
FIG. 3 shows another embodiment variant of a cultivator tip.
Figure 4:
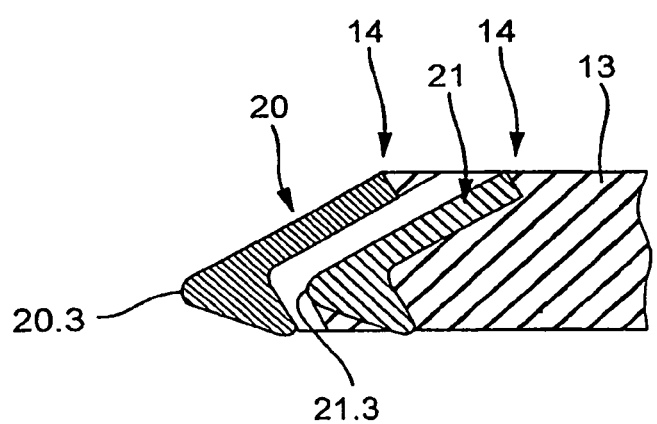
FIG. 4 is a sectional view along the cutting line labeled IV-IV in FIG. 3.

FIGS. 3 and 4 show another embodiment of a cultivator tip of this invention. In this case, a primary cutting element 20 and two secondary cutting elements 21 are built into a cutter holder 13. The design of the primary cutting element 20 and the secondary cutting elements 21 essentially corresponds to that shown in FIGS. 1 and 2, thus permitting reference to the preceding explanations. In addition, the embodiment of the cutting element mounts 14 essentially corresponds to that of the cultivator tips shown in FIGS. 1 and 2. To this extent, reference is also made to the preceding explanations. By contrast with the cultivator tips according to FIGS. 1 and 2, in the present case, only two secondary cutting elements 21 are provided, whose cutting edges 20.3 are oriented parallel to each other and are flush with each other. It is also possible for the cutting edges 20.3 to be parallel but offset from each other. In addition, the cultivator tip according to FIGS. 3 and 4 has a rib structure formed onto it at the front, which facilitates the penetration of the cultivator tip into the soil. In addition, excavated material can be compressed in the recesses between the ribs. This results in a "natural" wear protection.

Figure 5:
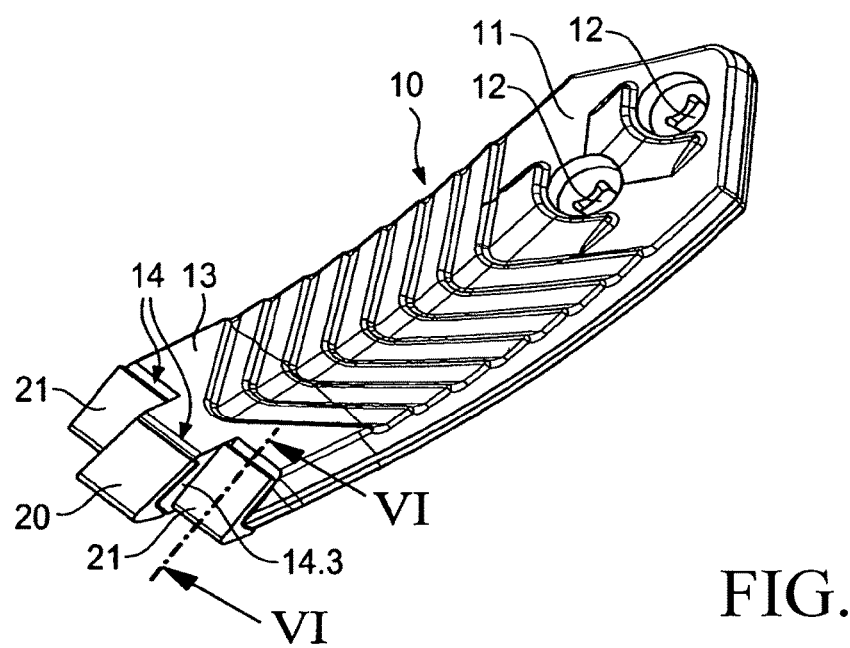
FIG. 5 is a perspective view of another embodiment of a cultivator tip.
Figure 6:
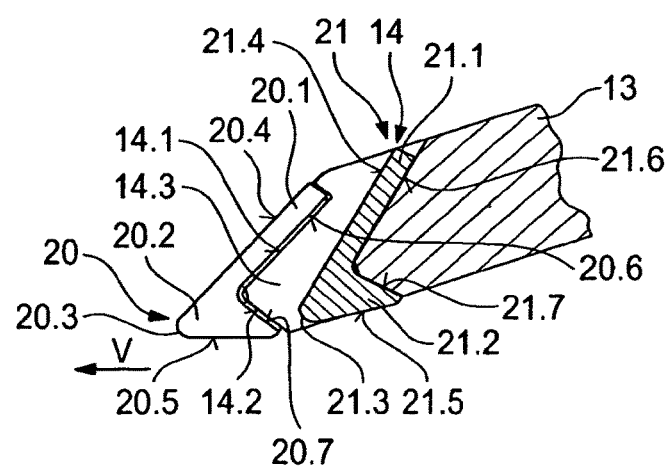
FIG. 6 is a sectional view taken along the cutting line labeled VI-VI in FIG. 5.

The cultivator tip according to FIGS. 5 and 6 is a modification of the cultivator tip according to FIGS. 3 and 4. As mentioned above, the diverting surfaces 21.4 and the open surfaces 21.5 of the secondary cutting elements 21 are oriented at an angle relative to the diverting surface 20.4 and open surface 20.5 of the primary cutting element 20. The primary cutting element 20 in this case is in a flatter orientation relative to the advancing direction V than the secondary cutting elements 21. As a result, the primary cutting element 20 bites into the soil more sharply, while the secondary cutting elements 21 provide a greater displacement.

FIG. 6 shows that the cutting edges 21.3 of the secondary cutting elements 21 are offset transversely to the advancing direction V and opposite the force of gravity relative to the cutting edge 20.3 of the primary cutting element 20. This produces less of a tendency to form a trench bottom because the primary cutting element 20 opens deeper furrows.

Figure 7:
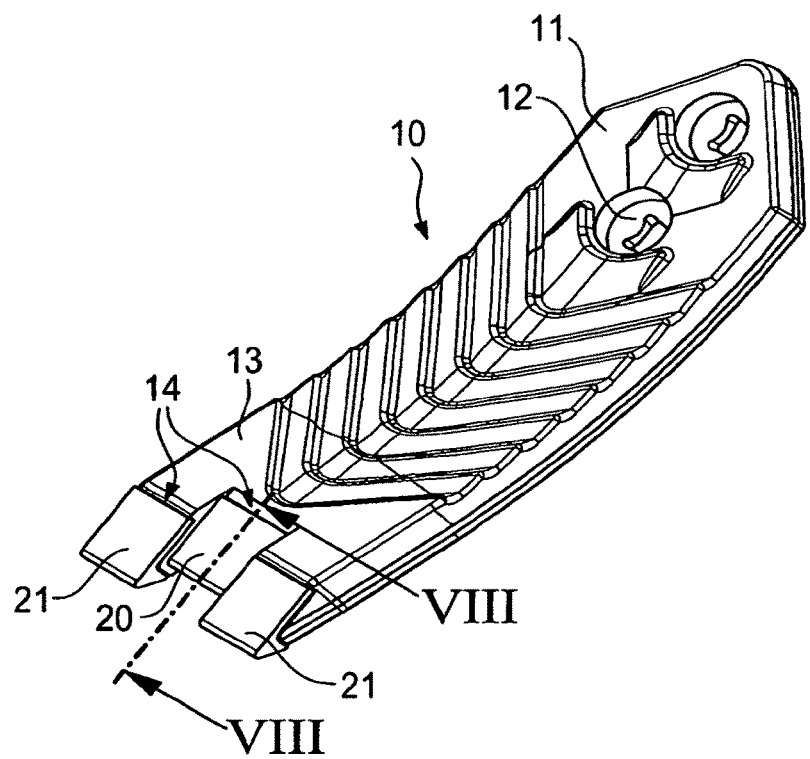
FIG. 7 is a perspective view of another embodiment of a cultivator tip.
Figure 8:
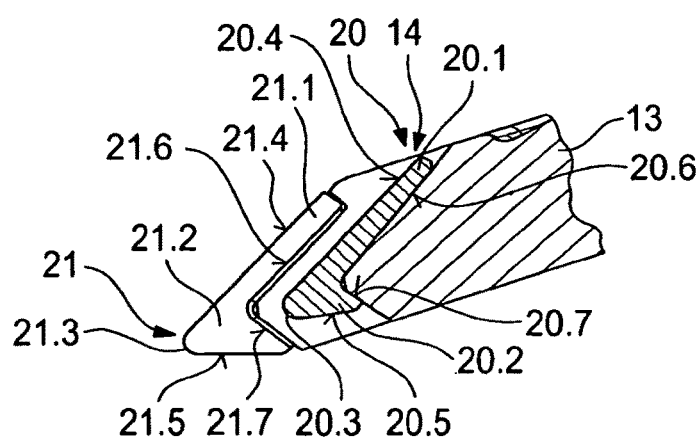
FIG. 8 is a sectional view taken along the cutting line labeled VIII-VIII in FIG. 7.
Figure 9:
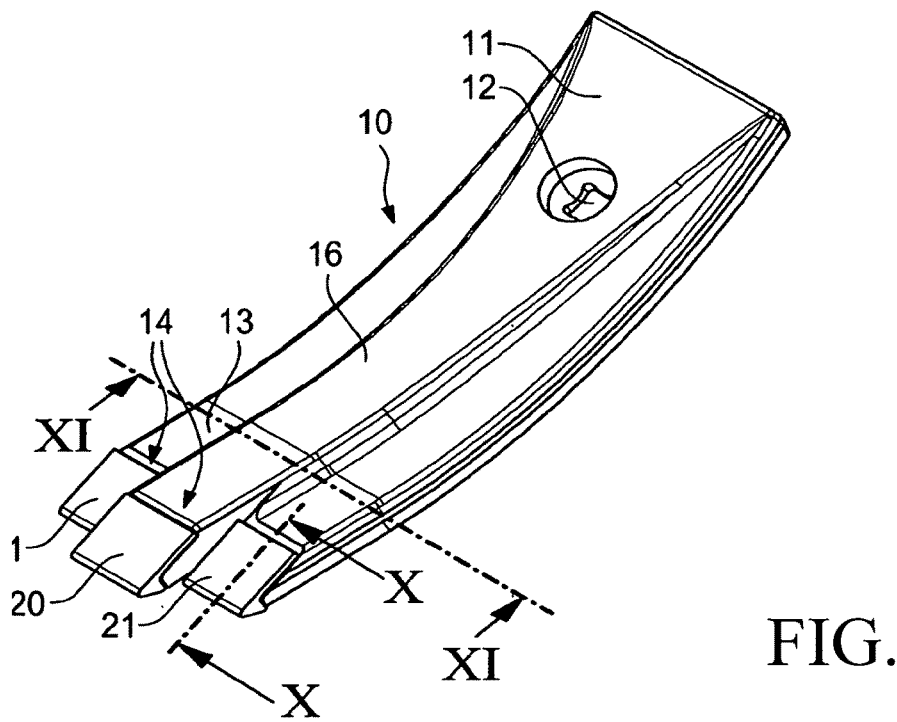
FIG. 9 is a perspective view of another embodiment of a cultivator tip.
Figure 10:
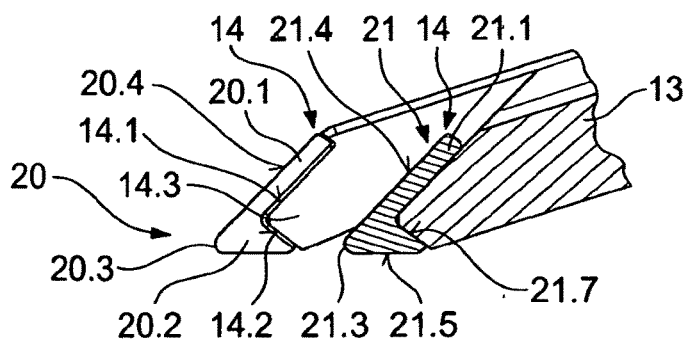
FIG. 10 is a sectional view taken along the cutting line labeled X-X in FIG. 9.

The same effect can also be achieved if the cutting edges 21.3 of the secondary cutting elements 21 are lower than the cutting edge 2.3 of the primary cutting element 20. FIGS. 7 and 8 show such an embodiment where the support 10 is again provided with a breaking rib 16 on its side oriented in the advancing direction V. This breaking rib 16 forms the cutting element mount 14 for the primary cutting element 20. Starting from the primary cutting element 20, the breaking rib 16 continuously widens in the direction toward the end of the support 10 oriented away from the primary cutting element 20. This achieves a structure that is optimized in terms of stress. In addition, the breaking rib 16 also reinforces the support 10 and increases the section modulus in opposition to flexion in the main direction of force. FIG. 10 shows that a breaking groove 17 is recessed into the back of the support 10. Once again, this groove extends starting from the primary cutting element 20 in the direction toward the rear end of the support 10, as shown in FIGS. 9 and 10.

The above-mentioned breaking rib 16 breaks up clods in a favorable manner and a certain amount of material flow into the breaking groove 17 can be produced for the benefit of a lower required traction force. In addition, this design also counteracts the undesirable formation of a trench bottom.

Figure 13:
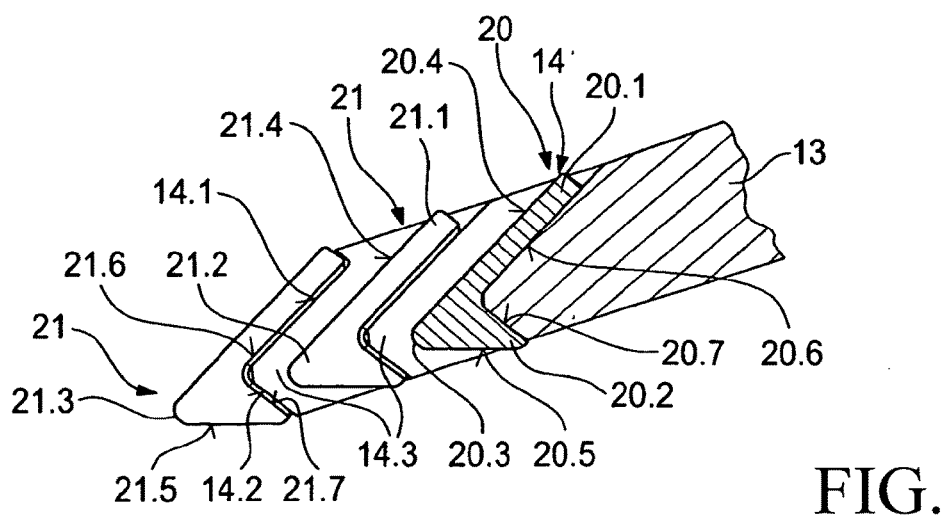
FIG. 13 is a sectional view of the cultivator tip according to FIG. 12, viewed along the cutting line labeled XIII-XIII in FIG. 12.
Figure 14:
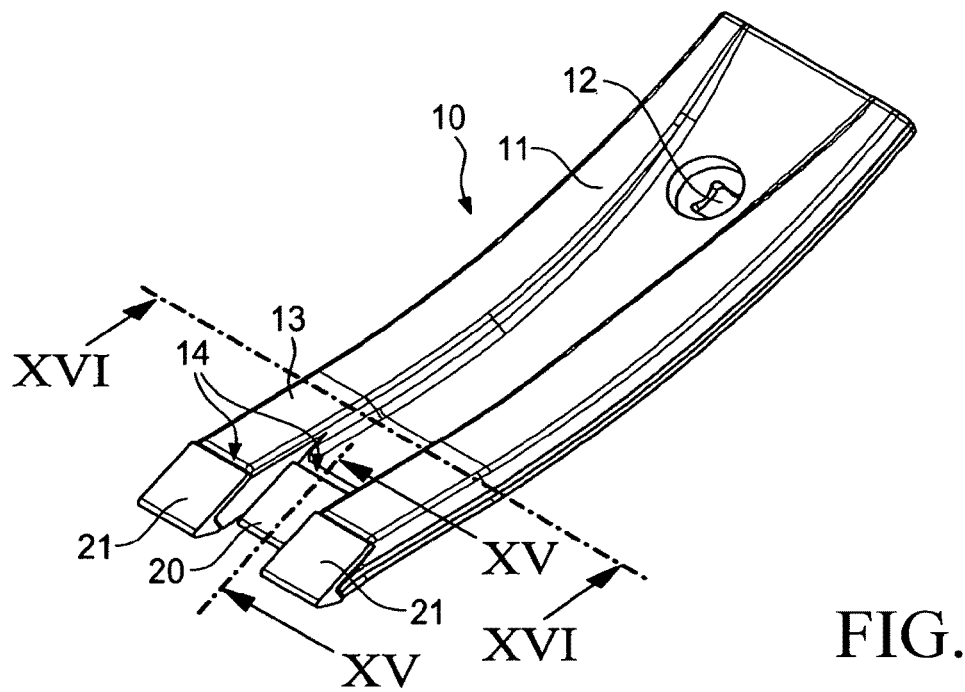
FIG. 14 is a perspective view of another embodiment of a cultivator tip.
Figure 15:
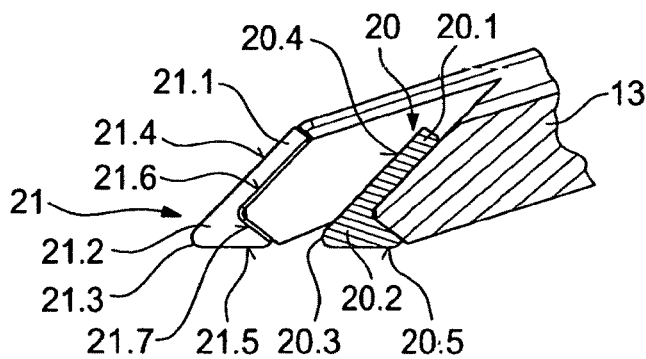
FIG. 15 is a sectional view of the cultivator tip according to FIG. 14, viewed along the cutting line labeled XV-XV in FIG. 14.
Figure 16:
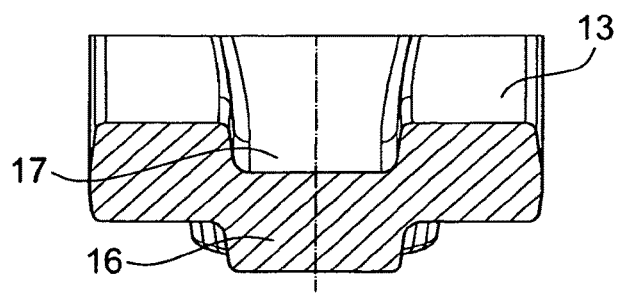
FIG. 16 is a sectional view taken along the cutting line labeled XVI-XVI in FIG. 14.

The same effect can also be achieved if on the contrary, a breaking groove 17 is formed into the front of the support 10 and a breaking rib 16 is formed onto the back. Such a design is featured in the exemplary embodiment shown in FIGS. 13 through 15.

Figure 11:
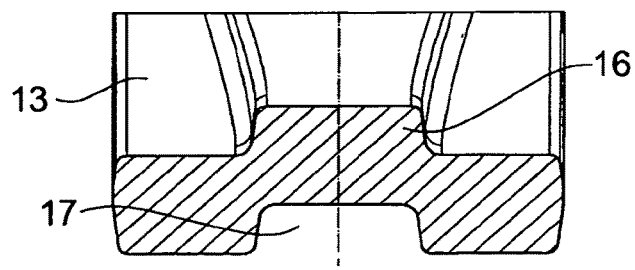
FIG. 11 is a sectional view taken along the cutting line labeled XI-XI in FIG. 9.
Figure 12:
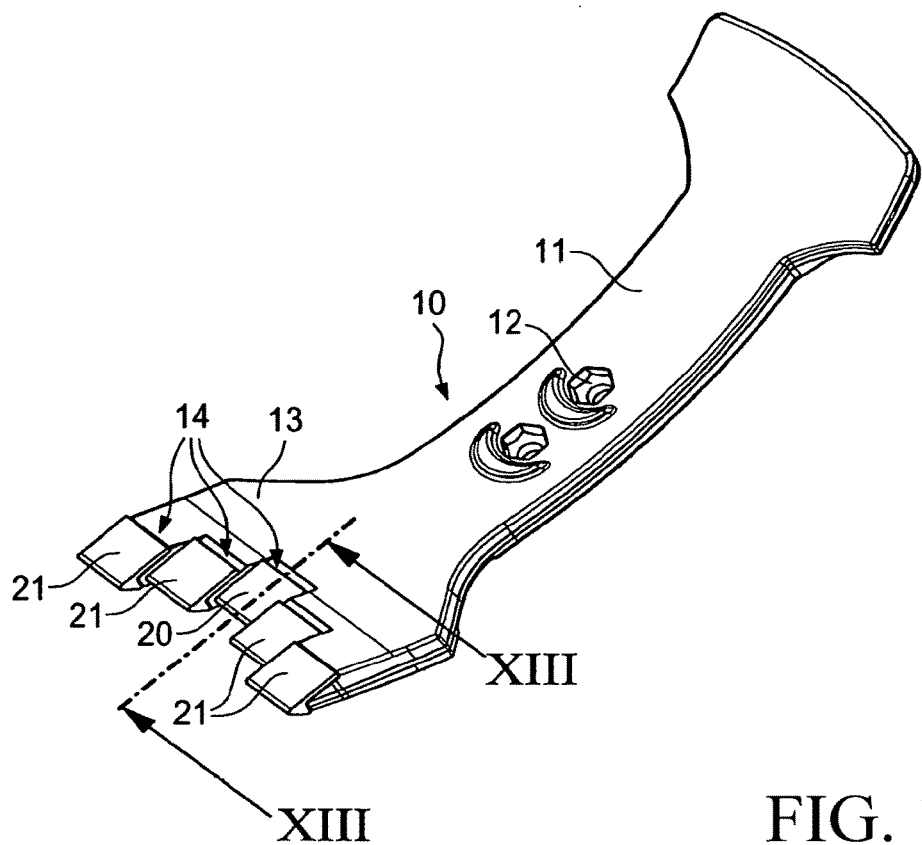
FIG. 12 is a perspective view of another embodiment of a cultivator tip.

FIGS. 7 and 8 and FIGS. 11 through 15 show exemplary embodiments in which the primary cutting element 20 is recessed relative to the secondary cutting elements 21 in the opposite direction from the advancing direction V. Consequently, the front pair of secondary cutting elements 21 always engages the soil first, producing an initial separating action. Then, the second pair of secondary cutting elements 21, such as shown in FIGS. 11 and 12, and then the primary cutting element 20 dig in. More of the wear is thus distributed onto the two secondary cutting elements 21. As a result of this wear-optimized tool design, it is in particular also possible to use the same parts for the secondary cutting elements 21 and the primary cutting element 20.

The invention claimed is:

1. A soil working tool being a cultivator tip comprising:
a support (10) including a cutter holder (13) at a first end, the cutter holder (13) including a primary cutting element mount (14) between and offset from each of at least two adjacent secondary cutting element mounts (14);
a primary cutting element (20) mounted on the primary cutting element mount;
at least two secondary cutting elements (21) each mounted on a corresponding one of the at least two secondary cutting element mounts;
wherein each of the primary cutting element (20) and the secondary cutting elements (21) is formed of a first material that is harder than a second material forming the cutter holder and has a respective cutting edge (20.3, 21.3), each of the cutting edges (21.3) of the secondary cutting elements (21) is positioned offset from the cutting edge (20.3) of the primary cutting element (20), the primary cutting element is disposed between the secondary cutting elements, and the primary cutting element is situated to protrude in an advancing direction of the soil working tool relative to each of the secondary cutting elements or is recessed in the advancing direction of the soil working tool relative to the each of the secondary cutting elements;
wherein each of the primary cutting element mount (14) and the secondary cutting element mounts (14) has a seat surface (14.1) and a contact surface (14.2) at an angle to the seat surface (14.1), and the primary cutting element (20) and the secondary cutting elements (21) are each supported with a respective fastening section (20.1; 21.1) that extends from the respective cutting edge (20.3, 21.3) and that has a first support surface disposed against the seat surface (14.1), and with a respective cutting attachment (20.2; 21.2) that extends from the respective cutting edge (20.3, 21.3) at an angle to the respective fastening section (20.1; 21.1) and that has a second support surface disposed against the contact surface (14.2);
wherein the primary cutting element (20) is integrally joined on the primary cutting element mount (14) and each of the at least two secondary cutting elements (21) is integrally joined on a corresponding one of the at least two secondary cutting element mounts, wherein the integrally joined connection is between the first and second support surfaces and a corresponding one of the seat surface and the contact surface.

2. The soil working tool as recited in claim 1, wherein the cutting edges (21.3) of the secondary cutting elements (21) are parallel to one another.

3. The soil working tool as recited in claim 2, wherein the cutting edge (20.3) of the primary cutting element (20) is parallel to the cutting edges (21.3) of the secondary cutting elements (21).

4. The soil working tool as recited in claim 3, wherein the cutting edge (20.3) of the primary cutting element (20) is spaced at least 4 mm apart from the cutting edge (21.3) of each of the secondary cutting elements (21).

5. The soil working tool as recited in claim 4, wherein the cutting edge (20.3) of the primary cutting element (20) is spaced at most 15 mm apart from the cutting edge (21.3) of each of the secondary cutting elements (21).

6. The soil working tool as recited in claim 5, wherein the contact surface (14.2) or the seat surface (14.1) of each of the secondary cutting elements (21) and of the primary cutting element (20) are oriented parallel to one another.

7. The soil working tool as recited in claim 6, wherein the seat surfaces (14.1) are spaced apart from one another by a distance in the range from 8 mm to 14 mm.

8. The soil working tool as recited in claim 7, wherein the contact surfaces (14.2) are spaced apart from one another by a distance in a range from 10 mm to 15 mm.

9. The soil working tool as recited in claim 8, wherein both the primary cutting element (20) and the secondary cutting elements (21) have diverting surfaces (20.4; 21.4) situated parallel to one another and spaced apart from one another by a distance in the range from 5 mm to 11 mm.

10. The soil working tool as recited in claim 9, wherein the diverting surfaces (20.4; 21.4) are situated at an angle to each other in a range between 0.1° and 90°.

11. The soil working tool as recited in claim 10, wherein on the cutter holder (13), the secondary cutting elements (21) are situated symmetrical to the primary cutting element (20).

12. The soil working tool as recited in claim 11, wherein the width of the cutting edges (21.3) of the secondary cutting elements (21) is at least 0.5 times the width of the cutting edge (20.3) of the primary cutting element (20).

13. The soil working tool as recited in claim 12, wherein the cutting edge (20.3) of the primary cutting element (20) is offset transversely to the advancing direction (V) and in a direction of a force of gravity relative to the cutting edge (21.3) of the secondary cutting elements (21).

14. The soil working tool as recited in claim 1, wherein the cutting edge (20.3) of the primary cutting element (20) is parallel to the cutting edges (21.3) of the secondary cutting elements (21).

15. The soil working tool as recited in claim 14, wherein the cutting edges (21.3) of the secondary cutting elements (21) are flush with one another.

16. The soil working tool as recited in claim 1, wherein the cutting edge (20.3) of the primary cutting element (20) is spaced at least 4 mm apart from the cutting edge (21.3) of each of the secondary cutting elements (21).

17. The soil working tool as recited in claim 1, wherein the cutting edge (20.3) of the primary cutting element (20) is spaced at most 15 mm apart from the cutting edge (21.3) of each of the secondary cutting elements (21).

18. The soil working tool as recited in claim 1, wherein the contact surface (14.2) or the seat surface (14.1) of each of the secondary cutting elements (21) and of the primary cutting element (20) are oriented parallel to one another.

19. The soil working tool as recited in claim 1, wherein both the primary cutting element (20) and the secondary cutting elements (21) have diverting surfaces (20.4; 21.4) situated parallel to one another and spaced apart from one another by a distance of at least 4 mm.

20. The soil working tool as recited in claim 19, wherein the diverting surfaces (20.4; 21.4) are situated at an angle to each other in a range between 0.1° and 90°.

21. The soil working tool as recited in claim 1, wherein on the cutter holder (13), the secondary cutting elements (21) are situated symmetrical to the primary cutting element (20) and on both sides of it.

22. The soil working tool as recited in claim 1, wherein at least two secondary cutting elements (21) are respectively situated on both sides of and abutting a flank of the primary cutting element (20).

23. The soil working tool as recited in claim 1, wherein the width of the cutting edges (21.3) of the secondary cutting elements (21) is at least 0.5 times the width of the cutting edge (20.3) of the primary cutting element (20).

24. The soil working tool as recited in claim 1, wherein the cutting edge (20.3) of the primary cutting element (20) is offset transversely to the advancing direction (V) and in a direction of a force of gravity relative to the cutting edge (21.3) of the secondary cutting elements (21).

25. The soil working tool as recited in claim 1, wherein the support (10) has a protruding breaking rib (16) or a recessed breaking groove (17).

26. The soil working tool as recited in claim 1, wherein the support (10) includes a fastening section (11) extending from the cutter holder (13), and the fastening section (11) includes fastening mounts (12) comprising holes extending through the support (10).

27. The soil working tool as recited in claim 1, the primary cutting element (20) is soldered on the primary cutting element mount (14) and each of the at least two secondary cutting elements (21) is soldered on a corresponding one of the at least two secondary cutting element mounts.

28. A soil working tool being a cultivator tip comprising:
a support (10) including a cutter holder (13) at a first end, the cutter holder (13) including a primary cutting element mount (14) between and offset from each of at least two adjacent secondary cutting element mounts (14);
a primary cutting element (20) mounted on the primary cutting element mount;
at least two secondary cutting elements (21) each mounted on a corresponding one of the at least two secondary cutting element mounts;
wherein each of the primary cutting element (20) and the secondary cutting elements (21) has a respective cutting edge (20.3, 21.3), each of the cutting edges (21.3) of the secondary cutting elements (21) is positioned offset from the cutting edge (20.3) of the primary cutting element (20), the cutting edge (20.3) of the primary cutting element (20) is parallel to each of the cutting edges (21.3) of the secondary cutting elements (21), and the cutting edges (21.3) of the secondary cutting elements (21) are disposed flush with one another on opposing sides of the primary cutting element (20);
wherein each of the primary cutting element mount (14) and the secondary cutting element mounts (14) has a seat surface (14.1) and a contact surface (14.2) at an angle to the seat surface (14.1), and the primary cutting element (20) and the secondary cutting elements (21) are each supported with a respective fastening section (20.1; 21.1) that extends from the respective cutting edge (20.3, 21.3) and that has a first support surface disposed against the seat surface (14.1), and with a respective cutting attachment (20.2; 21.2) that extends from the respective cutting edge (20.3, 21.3) at an angle to the respective fastening section (20.1; 21.1) and that has a second support surface disposed against the contact surface (14.2).

29. The soil working tool as recited in claim 28, wherein the at least two secondary cutting elements (21) are respectively situated on both sides of and abutting a flank of the primary cutting element (20).

30. The soil working tool as recited in claim 28, wherein the seat surfaces (14.1) are spaced apart from one another by a distance in the range from 8 mm to 14 mm.

31. The soil working tool as recited in claim 28, wherein the contact surfaces (14.2) are spaced apart from one another by a distance of at least 4 mm.

32. A soil working tool being a cultivator tip comprising:
a support (10) including a cutter holder (13) at a first end, the cutter holder (13) including a primary cutting element mount (14) between and offset from each of at least two adjacent secondary cutting element mounts (14);
a primary cutting element (20) mounted on the primary cutting element mount;
at least two secondary cutting elements (21) each mounted on a corresponding one of the at least two secondary cutting element mounts, wherein the at least two secondary cutting elements (21) are respectively situated on both sides of and abutting a flank of the primary cutting element (20);
wherein each of the primary cutting element (20) and the secondary cutting elements (21) has a respective cutting edge (20.3, 21.3), each of the cutting edges (21.3) of the secondary cutting elements (21) is positioned offset from the cutting edge (20.3) of the primary cutting element (20), the cutting edge (20.3) of the primary cutting element (20) is parallel to each of the cutting edges (21.3) of the secondary cutting elements (21), and the cutting edges (21.3) of the secondary cutting elements (21) are disposed flush with one another on opposing sides of the primary cutting element (20).

33. The soil working tool as recited in claim 32, wherein the primary cutting element (20) is situated to protrude in an advancing direction (V) relative to the secondary cutting elements or is recessed relative to the secondary cutting elements (20).

34. The soil working tool as recited in claim 32, wherein each of the primary cutting element (20) and the secondary cutting elements (21) is formed of a first material that is harder than a second material forming the cutter holder.

\* \* \* \* \*